United States Patent
Beadle et al.

(10) Patent No.: US 6,757,895 B1
(45) Date of Patent: *Jun. 29, 2004

(54) METHOD AND APPARATUS TO SELECTIVELY DEFINE JAVA VIRTUAL MACHINE INITIALIZATION PROPERTIES USING A BROWSER GRAPHICAL USER INTERFACE

(75) Inventors: Bruce Anthony Beadle, Round Rock, TX (US); Michael Wayne Brown, Georgetown, TX (US); Michael Aaron Kaply, Austin, TX (US); Kelvin Roderick Lawrence, Round Rock, TX (US); Douglas Scott Rothert, Austin, TX (US); Robert Michael Russin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/127,337

(22) Filed: Jul. 31, 1998

(51) Int. Cl.[7] .................................................. G06F 9/00
(52) U.S. Cl. ............................................... 718/1; 713/1
(58) Field of Search ........................... 709/1, 328, 203, 709/227, 229, 217, 220, 222, 221; 713/1, 2, 100; 717/1, 174–178; 707/206; 345/733, 738–740; 718/1; 719/328

(56) References Cited

U.S. PATENT DOCUMENTS

| | | | | |
|---|---|---|---|---|
| 5,367,686 A | * | 11/1994 | Fisher et al. | 395/700 |
| 5,603,034 A | * | 2/1997 | Swanson | 395/701 |
| 6,205,476 B1 | * | 3/2001 | Hayes, Jr. | 709/220 |
| 6,332,218 B1 | * | 12/2001 | Walker et al. | 717/11 |
| 6,433,794 B1 | * | 8/2002 | Beadle et al. | 345/700 |

OTHER PUBLICATIONS

US 2002/0095396 A1, Frerking et al.*
Java Plug–in 1.4.1 Developer Guide, chapters 9, 21, Aug. 3, 2002, Sun Microsystems.*
A. King, Inside Windows 95, Microsoft Press, 1994, pp. 68–75, 242–244.*
R. Simon, et al, Windows 95 WIN32 Programming API Bible, Waite Group Press, 1996, pp. 999–1006.*
T. Lindholm, et al, The Java Virtual Machine Specification, Addison–Wesley, 1996, p. 63.*

* cited by examiner

Primary Examiner—Sue Lao
(74) Attorney, Agent, or Firm—Duke W. Yee; Jeffrey S. LaBaw; Stephen R. Tkacs (57) ABSTRACT

A method for selecting options for a virtual machine in a data processing system. The browser provides an interface in which the interface allows for selection of options for use by the virtual machine. A selection of an option is received for use by the virtual machine. The selection of the option is stored, wherein the selection of the option is used by the browser when initializing the virtual machine.

15 Claims, 5 Drawing Sheets

| FIELD NAME | JAVA FLAG | DESCRIPTION |
|---|---|---|
| nativeStackSize | -ss | Max Stack Size for native threads |
| javaStackSize | -oss | Max Stack for any JVM thread |
| minHeapSize | -ms | Initial heap size |
| maxHeapSize | -mx | Maximum heap size |
| verifyMode = 0 | -noverify | Do not verify byte code when loading |
| verifyMode = 1 | -verifyremote | verify byte code only when loading remotely |
| verifyMode = 2 | -verify | verify loading of all byte code |
| classpath | -classpath | Local directories for loading classes |
| enableClassGC | -noclassgc | Enable/disable class garbage collection |
| enableVerboseGC | -verbosegc | Enable reporting of garbage collection |
| disableAsyncGC | -noasyncgc | Disable asynchronous garbage collection |
| verbose | -verbose of -v | Reports JVM information, including all class loads |
| debugging | -debug | Allow remote debugging of JVM |

FIG. 9

METHOD AND APPARATUS TO SELECTIVELY DEFINE JAVA VIRTUAL MACHINE INITIALIZATION PROPERTIES USING A BROWSER GRAPHICAL USER INTERFACE

CROSS-REFERENCE TO RELATED APPLICATION

The present invention is related to the following applications entitled "Method and Apparatus for Selectively and Dynamically Selecting Classes in a Data Processing System", U.S. patent application Ser. No. 09/127,336, filed even date hereof, assigned to a common assignee, and "Method and Apparatus for Selecting a Java Virtual Machine For Use With a Browser", U.S. patent application Ser. No. 09/127,339, filed even date hereof, are incorporated herein by reference.

BACKGROUND OF THE INVENTION

1. Technical Field

The present invention provides an improved data processing system and in particular an improved method and apparatus for selecting properties for a JVM. Still more particularly, the present invention provides a method and apparatus for selecting initializing properties for a Java virtual machine used with a browser.

2. Description of Related Art

Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), a known protocol for handling the transfer of various data files (e.g., text; still graphic images, audio, motion video, etc.). Information is formatted for presentation to a user by a standard page description language, the Hypertext Markup Language (HTML). In addition to basic presentation formatting, HTML allows developers to specify "links" to other web resources identified by a Uniform Resource Locator (URL). A URL is a special syntax identifier defining a communications path to specific information. Each logical block of information accessible to a client, called a "page" or a "web page", is identified by a URL. The URL provides a universal, consistent method for finding and accessing this information by the web "browser". A browser is a program capable of submitting a request for information identified by a URL at the client machine. Retrieval of information on the web is generally accomplished with an HTML-compatible browser.

When a user desires to retrieve a page, a request is submitted to a server connected to a client computer at which the user is located and may be handled by a series of servers to effect retrieval of the requested information. The information is provided to the client formatted according to HTML. Typically, personal computers (PCs) along with work stations are typically used to access the Internet.

Often applications or programs may be sent to a computer from a web server across the Internet. Java applications are becoming increasingly more prevalent as the type of application sent between web servers and client computers. Java applications are common on the Internet and becoming more increasingly common in intranets and in other types of networks used in businesses.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a part in the JVM that alternately decodes and interprets a bytecode or bytecodes. These bytecode instructions are designed to be easy to interpret on any computer and easily translated on the fly into native machine code.

Presently available browsers are designed using a fixed embedded JVM in which the browsers pass fixed options to the JVM. Such a design limits the flexibility of developers and users of Java applets within the browser. "Applets" are mini applications that typically run inside a Java-enabled browser, such as Netscape Communicator. In particular, users cannot change properties, such as, for example, initial heap size and garbage collection from within a browser. Such a situation would prevent running an applet using a browser in which the applet requires a stack size that is larger than one coded for the browser.

Therefore, it would be advantageous to have an improved method and apparatus for providing users an ability to select and pass options to a JVM used in association with a browser.

SUMMARY OF THE INVENTION

The present invention provides a method for selecting options for initializing a virtual machine in a data processing system. The browser provides an interface in which the interface allows for selection of options for use by the virtual machine. A selection of an option is received for use by the virtual machine. The selection of the option is stored, wherein the selection of the option is used by the browser when initializing the virtual machine.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
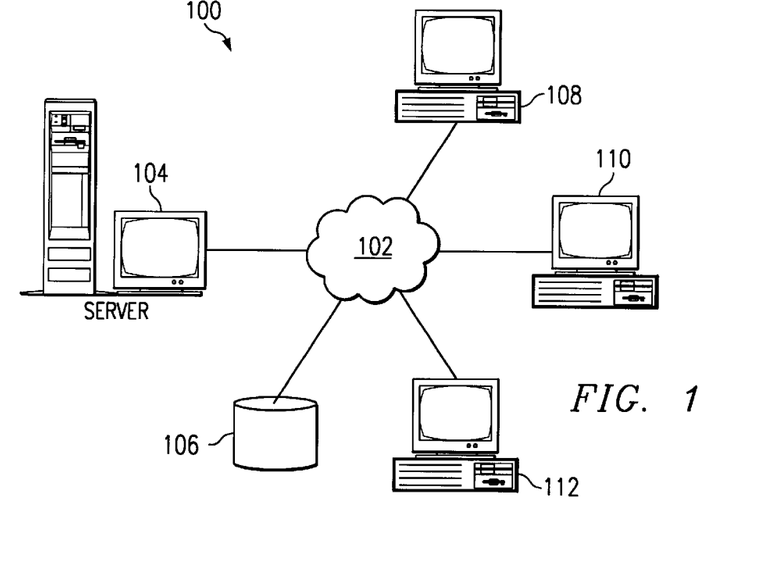
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers of network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as an umber of different types of networks, such as for example, an intranet or a local area network.

FIG. 1 is intended as an example, and not as an architectural limitation for the processes of the present invention.

Figure 2:
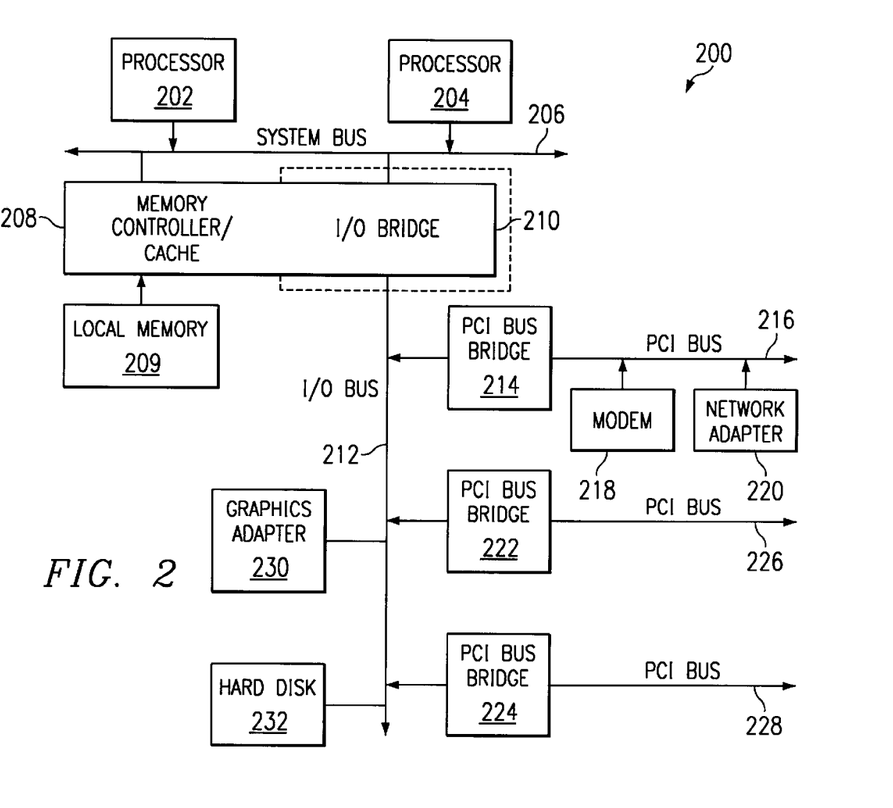
FIG. 2 is a block diagram of a data processing system which may be implemented as a server in accordance to the present invention.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
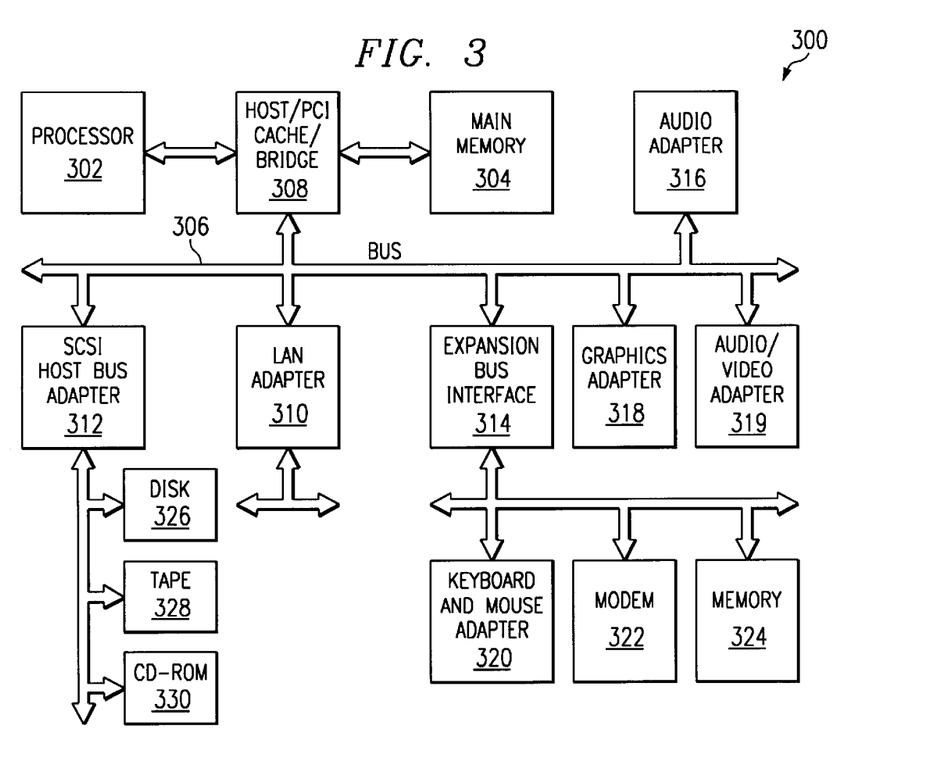
FIG. 3 is a block diagram of a data processing system in which the present invention may be implemented.

With reference now to FIG. 3, a block diagram of a data processing system 300 in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 112 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 1. The operating system may be a commercially available operating system such as OS/2, which is available from International Business Machines Corporation. "OS/2" is a trademark of from International Business Machines Corporation. An object oriented programming system such as Java environment may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

The present invention provides a method, apparatus, and instructions to selectively and dynamically at run time define Java virtual machine initializing properties. The present invention provides a mechanism to selectively define initializing properties for a JVM through a graphical user interface (GUI) provided by a browser. The present invention provides a high level of integration, which provides users with maximum flexibility in selecting various extended Java options to be passed on to a JVM for individual and multiple user environments. These users may include network administrators in a large corporate environment. A GUI is provided as part of the browser to allow a user to specify various options for use in initializing a JVM. For example, one user may find it necessary for performance reasons to increase the default stack size for a large applet typically browsed with a given user profile. As used herein, the term "browser" refers to browsers in addition to hypertext markup language (HTML) browsers, such as Netscape Communicator for OS/2. In addition, a browser may encompass other applications that navigate in a Java based network.

In the depicted examples, the processes and interfaces described are for a browser, such as Netscape Communicator operating in an OS/2 operating system. These examples are not intended to limit the invention to a particular browser or operating system. The processes and interfaces of the present invention may be applied to other types of browsers and operating systems.

Figure 4:
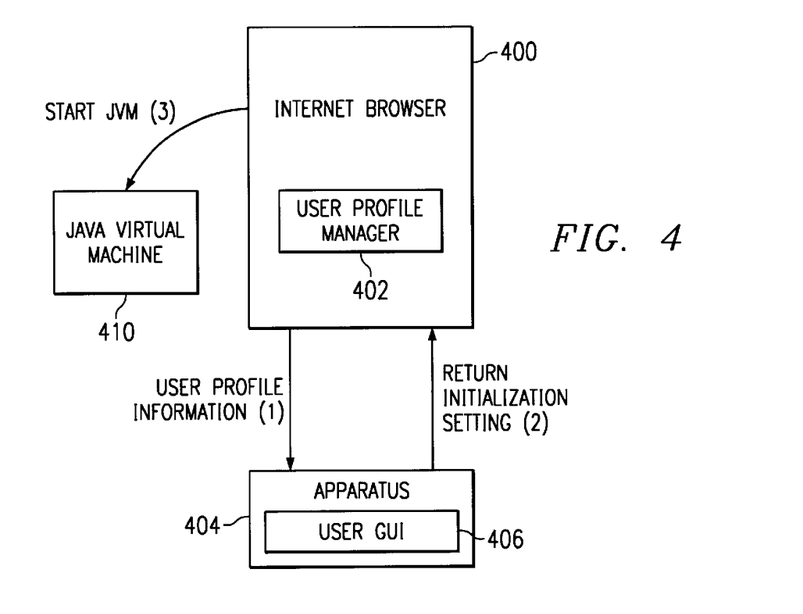
FIG. 4 is a diagram of components used to select classpath value in accordance with a preferred embodiment of the present invention.

With reference now to FIG. 4, a diagram of components used to select initialization options is depicted in accordance with a preferred embodiment of the present invention. Internet browser 400 contains a user profile manager 402, which is employed to manage one or more user profiles for internet browser 400. Internet browser 400 may be implemented by modifying a well known browser, such as, for example, Netscape Communicator, which is available from Netscape Communications Corporation. Selection module 404 contains the processes used in providing a user an ability to select various options or properties to be passed to a JVM. Selection module 404 presents a GUI 406 to the user, which allows the user to select options to be passed to a JVM when a JVM is initialized in association with the browser. Selection module 404 queries user profile manager 402 within internet browser 400 for user profile information to display to a user in selecting options. This information is displayed to the user through the GUI 406. Selections or changes in JVMs are received as user input through GUI 406. This user input is returned to user profile manager 402. When a JVM is to be started by internet browser 400, the user profile information with the options selected by the user is employed to initialize JVM 410.

Figure 5A:
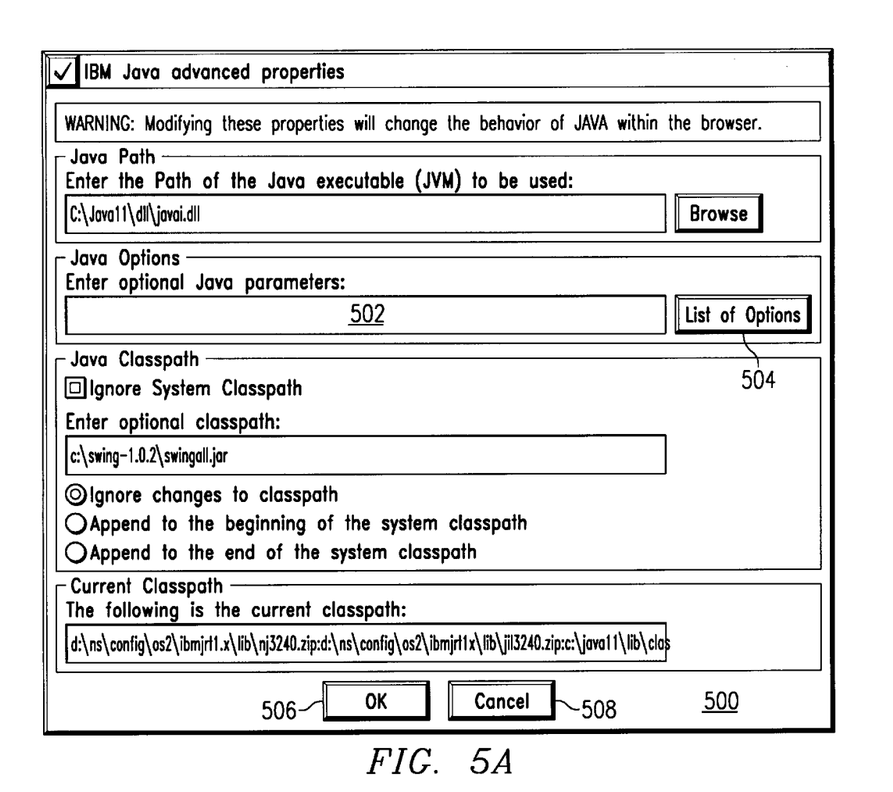
FIGS. 5A–5B are graphical user interfaces used in selecting options in accordance with a preferred embodiment of the present invention.
Figure 5B:
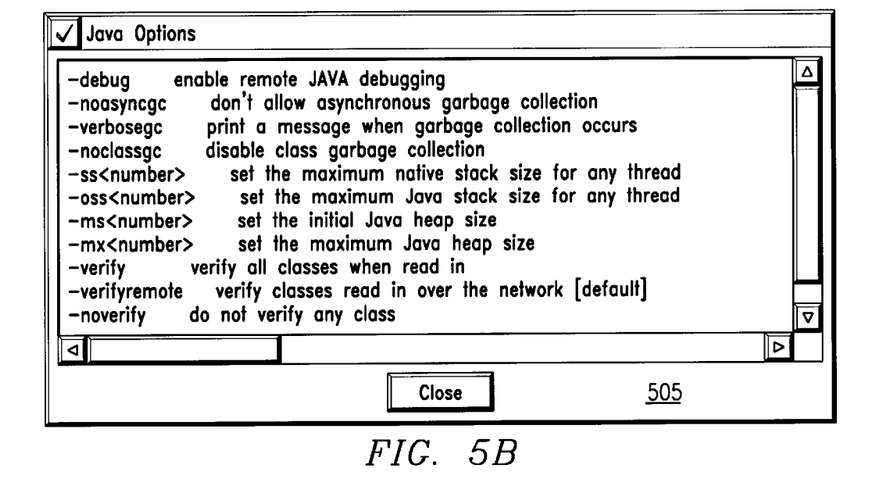

With reference next to FIGS. 5A–5B, graphical user interfaces used in selecting options depicted in accordance with a preferred embodiment of the present invention. Turning now to FIG. 5A, Java advanced properties dialog 500 is displayed to a user to allow for modification of various options for using a JVM with a browser. These options are important when using a JVM with a browser. For example, the option -debug would be an important option to set if debugging of an applet remotely is to be enabled. Java options field 502 is present in Java advanced properties dialog 500 to allow a user to enter various Java parameters for use in initializing the JVM. In addition, a user may select from various options from selecting List of Options button 504. In the depicted example, selection of this button displays options that may be entered by the user, as illustrated in dialog 505 in FIG. 5B. If the user is satisfied with the changes within Java advanced properties dialog 500, the user may select OK button 506 Cancel button 508 is selected if the user does not want to use options changed in Java advanced properties dialog 500.

Figure 6:
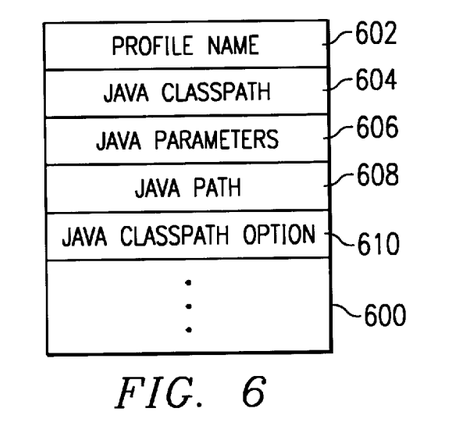
FIG. 6 is a diagram of a user profile data structure managed by a user profile manager in accordance with a preferred embodiment of the present invention.

With reference now to FIG. 6, a diagram of a user profile data structure managed by a user profile manager is depicted in accordance with a preferred embodiment of the present invention. User profile data structure 600 contains information used to configure behavior of the web browser for a particular user. User profile data structure 600 has its Java options managed through the use of interfaces, such as though illustrated in FIGS. 5A and 5B, while other options may be hard coded or managed through other mechanisms. In the depicted example, user profile data structure 600 includes a profile name 602, a Java class path 604, Java parameters 606, a Java path 608, and a Java class path option 610. Profile name 602 is used to uniquely identify the profile from other profiles when the browser contains multiple user profiles. Java class path 604 is used to identify the path in which classes are loaded for use by the JVM. Java parameters 606 contain parameters used by a JVM when the browser initializes or starts a JVM for use with the browser. These parameters may include, for example, initial heap size, garbage collection information, Java stack size, and reporting options for JVM information. Java path 608 includes the path and file name for the JVM that is to be used with the browser. Java class path option 610 provides information that may be used to depend an extended class path to the beginning or end of the system defined class path. User profile data structure 600 also includes other information (not shown) employed to define the behavior of the browser.

Figure 7:
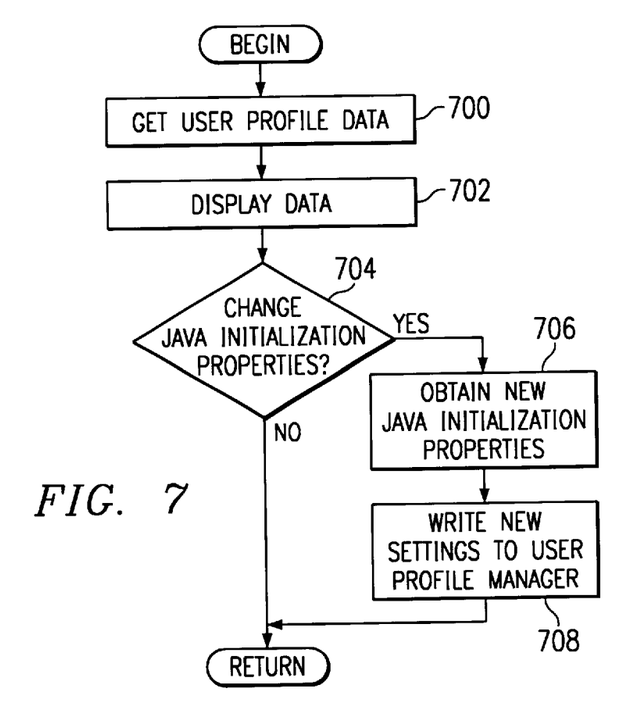
FIG. 7 is a high level flowchart of a process used to select initializing properties for a JVM used with a browser in accordance with a preferred embodiment of the present invention.

With reference now to FIG. 7, a high level flowchart of a process used to select initializing properties for a JVM used with a browser is depicted in accordance with a preferred embodiment of the present invention. The process begins by obtaining user profile data (step 700). This data is obtained from the user profile manager within the browser. The data is displayed to a user using a GUI (step 702). A determination is then made as to whether the Java initialization properties are to be changed (step 704). If the Java initialization properties are not not to be changed, the process terminates. Otherwise, new Java initialization properties are obtained (step 706). For example, this step may be used to change a maximum stack size for native threads, a maximum stack size for any JVM threads, initial heap size, and a maximum heap size for the JVM that is initialized by the browser. In the depicted example, the various properties are obtained through the Java advanced properties dialog as illustrated in FIG. 5. Thereafter, the new Java initialization properties are written or sent to the profile manager in the browser (step 708) with the process terminating thereafter.

Figure 8:
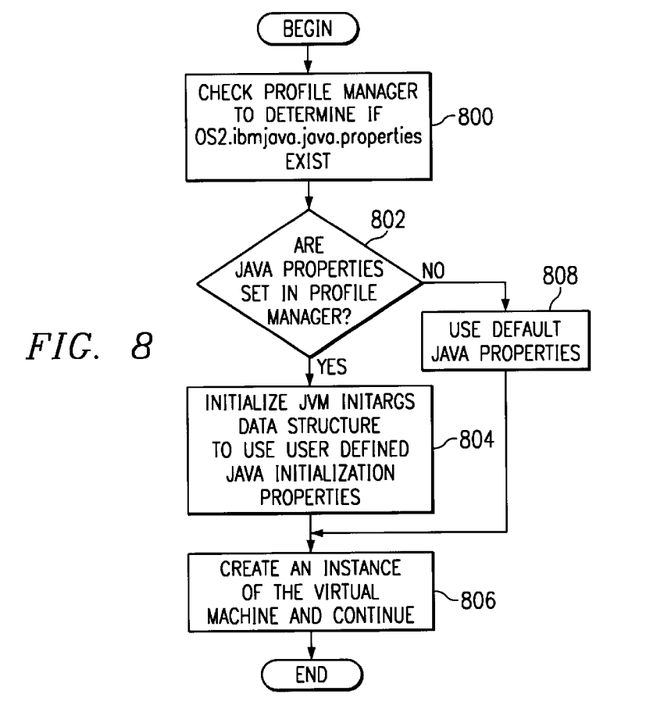
FIG. 8 is a flowchart of a process for starting a JVM using Java initialization properties in accordance with a preferred embodiment of the present invention.

Turning next to FIG. 8, a flowchart of a process for starting a JVM using Java initialization properties is depicted in accordance with a preferred embodiment of the present invention. The process begins by obtaining checking the profile manager to determine whether the property "OS2.ibm.java.properties" exists in the user profile data structure (step 800) for the user. This property is the user profile key used to find the user defined initialization properties within the user's profile. Next, a determination is made as to whether the Java initialization properties are set in the profile manager (step 802). This determination is made by checking the user profile data structure for the selected user. If the Java initialization properties are set in the profile manager, the process then initializes the JVM initialization arguments (Initargs) data structure to use user defined Java initialization properties in the user profile (step 804). Then, an instance of the virtual machine is created (step 806) with the process terminating thereafter.

With reference again to step 802, if Java initialization properties are not set in the profile manager, default Java properties are used to create an instance of the virtual machine (step 808). These default Java properties are stored in a default user profile data structure managed by the profile manager in accordance with a preferred embodiment of the present invention. The instance of the JVM is created by calling a Java native interface (JNI) application programming interface (API). A Java native interface is a native programming interface that allows Java code that runs inside a Java virtual machine to interoperate with applications and libraries written in other programming languages, such as C, C++ and assembly. In the depicted example, the JNI API provides an interface for native applications, such as a browser, to reach Java. The JNI is used to translate messages from other Java objects or components into calls used by the browser and to translate responses from the browser into messages that are recognized by Java objects or components. An example of a JNI API is JNI_CreateJavaVM, which may be found in JDK 1.1 from Sun Microsystems, Inc.

Figure 9:
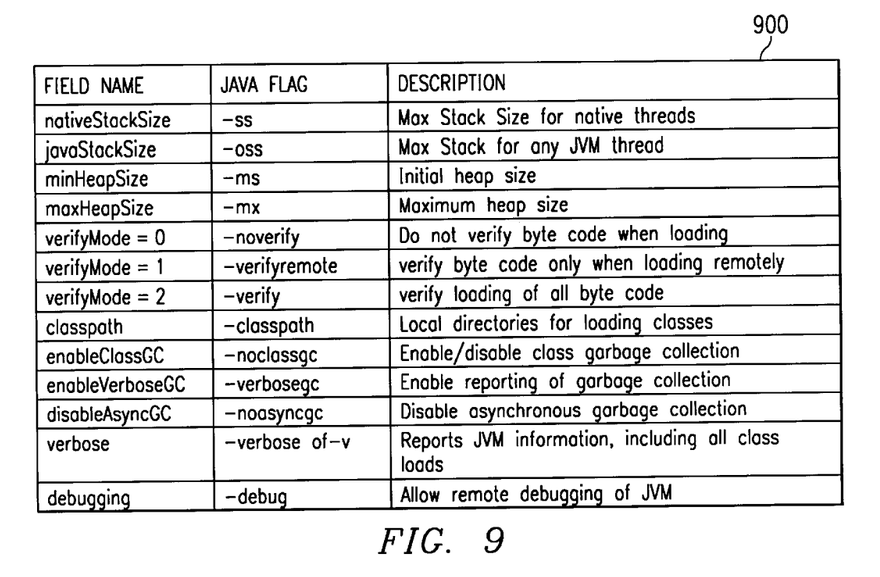
FIG. 9 is a diagram of a JVM initialization data structure in accordance with a preferred embodiment of the present invention.

Turning next to FIG. 9, a diagram of a JVM initialization data structure is depicted in accordance with a preferred embodiment of the present invention. JVM initialization data structure 900 illustrates various parameters that are used as by a JNI API to initialize a JVM. JVM initialization data structure 900 contains various Java initialization parameters that may be set by the user entering options, also referred to as "flags", in a Java advanced properties dialog. A maximum stack size for native threads and for JVM threads may be set using Java flags "-ss" and "-oss". An initial heap size may be set using the flag "-ms" while the maximum heap size set using the flag "-mx". If verification of bytecodes is not desirable when loading, the Java flag "-noverify" is used. Verification of bytecodes during remote loading is enabled by using the "-verifyremote" flag. Verification of all bytecodes is accomplished by using the "-verify" flag. Various garbage collection options are set by using "-noclassgc", "-verbosegc", and "-noasyncgc" flags. Reporting of JVM information may be set using the "-verbose of-v" flag. Other initialization options not shown in FIG. 9 may be set using the processes of the present invention depending on the available options for the JVM. The processes of the present invention are used to send initialization properties when JVMs are switched or alternatively, the processes of the present invention may be employed to dynamically switch JVM parameters or switch JVM parameters at run time.

Thus, the present invention provides an improved method, apparatus, and instructions for allowing flexibility in selecting initialization properties for a virtual machine through a browser interface. In particular, the present invention provides a GUI that allows a user to specify initialization properties that are used in initializing a JVM.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for selecting options for a virtual machine in a data processing system, the method comprising:

providing an interface through an application that uses a virtual machine in which the interface allows for selection of options for use by the virtual machine;

receiving a selection of an option for use by the virtual machine; and storing the selection of the option, wherein the selection of the option is used by the application when initializing the virtual machine.

2. The method of claim 1, wherein the interface is a graphical user interface.

3. The method of claim 1, wherein the virtual machine is a Java virtual machine.

4. The method of claim 1, wherein the option is stored by a profile manager in the application and further comprising:

initializing the virtual machine using the option stored by the profile manager.

5. The method of claim 1, wherein the step of storing the option comprises storing the option in a user profile associated with the application.

6. A method for selecting options for a virtual machine in a data processing system, the method comprising:

providing an interface through an application that uses a virtual machine in which the interface allows for selection of options for use by the virtual machine;

receiving a selection of an option for use by the virtual machine; and     storing the selection of the option, wherein the selection of the option is used by the application when initializing the virtual machine,     wherein the option is a heap size,     wherein the option is a garbage collection option.

7. A method for selecting options used in initializing a Java virtual machine associated with a browser, the method comprising:

displaying a graphical user interface which presents an option that is selectable for use in initializing the Java virtual machine;

receiving a selected option from the graphical user interface;

storing the selected option; and initializing the Java virtual machine using the selected option.

8. A system for selecting options for a virtual machine in a data processing system, the method comprising:

providing means for providing an interface through an application that uses a virtual machine in which the interface allows for selection of options for use by the virtual machine;

receiving means for receiving a selection of an option for use by the virtual machine; and     storage means for storing the selection of the option, wherein the selection of the option is used by the application when initializing the virtual machine.

9. The system of 8, wherein the virtual machine is a Java virtual machine.

10. The system of claim 8, wherein the option is stored by a profile manager in the application and further comprising:

initialization means for initializing the virtual machine using the option stored by the profile manager.

11. The system of claim 8, wherein the storage means comprises means for storing the option in a user profile associated with the application.

12. The system of claim 11, wherein the user profile is within a plurality of user profiles associated with the application in which options are stored in each of the plurality of user profiles.

13. A system for selecting options for a virtual machine in a data processing system, the method comprising:

providing means for providing an interface through an application that uses a virtual machine in which the interface allows for selection of options for use by the virtual machine;

receiving means for receiving a selection of an option for use by the virtual machine; and     storage means for storing the selection of the option, wherein the selection of the option is used by the application when initializing the virtual machine,     wherein the option is a heap size,     wherein the option is a garbage collection option.

14. The system of claim 8, wherein the application is a browser.

15. A computer program product in a computer readable medium for selecting options use in initializing a Java virtual machine associated with a browser, the computer program product comprising:

first instructions for displaying a graphical user interface which presents an option that is selectable for use in initializing the Java virtual machine;

second instructions for receiving a selected option from the graphical user interface;

third instructions for storing the selected option; and fourth instructions for initializing the Java virtual machine using the selected option.

\* \* \* \* \*